United States Patent [19]

Norres et al.

[11] Patent Number: 5,731,557
[45] Date of Patent: Mar. 24, 1998

[54] FLUID GUIDING ELEMENT FOR BLOCKING AND DAMPING NOISE PROPAGATING IN MAIN PASSAGES

[76] Inventors: Richard Norres; Albert Norres, both of Wieland Str. 2, D-45896 Gelsenkirchen, Germany

[21] Appl. No.: 771,795

[22] Filed: Dec. 20, 1996

[30] Foreign Application Priority Data

Dec. 20, 1995 [DE] Germany .................. 195 47 565.8

[51] Int. Cl.$^6$ ................................ F16K 47/02
[52] U.S. Cl. .................... 181/233; 181/252; 181/257
[58] Field of Search ..................... 181/233, 224, 181/238, 251, 252, 256, 257, 268, 279, 280; 138/114, 122, 124–127

[56] References Cited

U.S. PATENT DOCUMENTS

| 978,287 | 12/1910 | Grewe | 181/280 |
|---|---|---|---|
| 3,113,635 | 12/1963 | Allen et al. | 181/268 |
| 3,374,856 | 3/1968 | Wirt . | |
| 3,842,940 | 10/1974 | Bonikowski | 181/257 |
| 5,198,625 | 3/1993 | Borla | 181/252 X |

FOREIGN PATENT DOCUMENTS

| 0095582 | 4/1983 | European Pat. Off. . |
|---|---|---|
| 0346551B1 | 12/1988 | European Pat. Off. . |
| 0493161A1 | 12/1991 | European Pat. Off. . |
| 2264354 | 7/1974 | Germany . |
| 2749665 | 5/1979 | Germany . |
| 3830346C2 | 1/1992 | Germany . |
| 3220023C3 | 5/1993 | Germany . |
| 4445794C1 | 1/1996 | Germany . |
| 4445795C1 | 3/1996 | Germany . |

*Primary Examiner*—Khanh Dang
*Attorney, Agent, or Firm*—Michael J. Striker

[57] ABSTRACT

A fluid guiding element for blocking and damping noises propagating in it has a main passage composed of a flexible inner hose jacket which is resistant to mechanical, chemical or calloric load by a fluid to be guided through the fluid guiding element, an outer hose jacket, and a material insert arranged between the hose jackets and composed of a flexible material which is resistant at least to calloric loads, the main passage having a fluid inlet and a fluid outlet and being provided with at least one turn of substantially 360 between the fluid inlet and the fluid outlet, and at least one auxiliary passage arranged in a cross-section of the main passage and having sound-soft walls, the at least one auxiliary passage being composed of an inner hose jacket, an outer hose jacket and a material insert arranged between the inner and outer hose jackets, the auxiliary passage being provided with at least one turn of substantially 360°.

34 Claims, 7 Drawing Sheets

FLUID GUIDING ELEMENT FOR BLOCKING AND DAMPING NOISE PROPAGATING IN MAIN PASSAGES

BACKGROUND OF THE INVENTION

The present invention relates to a fluid guiding element with sound-soft walls for blocking and damping noises which propagate in main passages.

More particularly, it relates to a fluid damping element of this type, which has an inner hose jacket provided on its outer side with mass-enhancing elements and resistant to mechanical, chemical or caloric loading by the fluid, an outer hose jacket, and a material insert located between the hose jackets and formed so that it is soft and also flexible and is resistant at least to caloric loading, wherein at least one turn of 360° is provided between its fluid inlet and its fluid outlet.

Such a fluid guiding element is disclosed in nonpublished German patent applications P 44 45 794.4-53 and P 44 45 795.2-53. In the first patent application, the inner hose jacket, depending on mechanical, chemical caloric loading of fluid which is to be guided, can be composed of a textile, metal wire fabric, glass fiber fabric, synthetic fabric, natural fabric, ceramic fabric, nonwoven material or a soft thin foil of polyurethane or polyamide or polytetrafluoroethylene or a combination of these materials, which on its outer side is connected with mass-enhancing metal elements. The material insert is produced of a heap of mineral fibers and/or metal fibers and/or shavings and/or chips of entropieelastic materials, and the fluid guiding element between its gas inlet and its gas outlet has at least one turn of 360°.

In the second patent document, the outer hose jacket is formed as a container with sound-soft and sound-hard walls, in which an inner hose jacket as with the first patent document is arranged, and the intermediate space is filled with the material insert.

In gas turbines or air-driver pumps to be serviced on wide body airplanes, for example on Boeing machines of the type 747, a sound intensity at the outlet of the turbine is 150dB (A) and a gas temperature is approximately 200° C., and on main turbines a sound intensity is 165dB (A) and a core jet temperature is 820° C. Such a sound intensity constitutes a live danger for a human being. First experiments with the fluid guiding elements designed in accordance with the above mentioned patent documents for gas showed that with a sound intensity at the gas inlet of 150dB (A) and only one circular spiral turn of 360° of the fluid guiding element, a sound intensity reduction to 108dB (A) was obtained at the gas outlet. With three circular spiral windings of the fluid guiding element and a sound intensity of 150dB (A) at the gas inlet, 89dB (A) was measured at the gas outlet. Such a surprisingly substantial reduction of the sound intensity is not possible with all conventional and known guiding elements. This advantageous action can be explained only by the special construction of the fluid guiding element as well as a swinging out of the heavy, mass-enhancing metal elements, in particular the metal rings or the metal spirals, in the flexible material insert. Thereby the previously pronounced sound intensity reduction were obtained mainly by absorption and to a lower degree by reflection and interference phenomenon.

In a known fluid guiding element for gas of a similar type disclosed in the German patent document DE-OS 27 49 665 the inner hose jacket is composed of a soft-mesh fabric which is provided on its inner side with a spiral wire as a mass-enhancing element for reinforcing purpose. The outer hose jacket is formed of a foil, and a material insert composed of a foam matter is located between the foil and the fabric. The circular-ring-shaped end regions of this flexible and rectilinearly formed fluid guiding element are closed by glued end caps. In accordance with the conclusions of the inventor related to this fluid guiding element, the sound penetrates through the mesh of the fabric of the inner hose jacket into the material insert composed of a foam body and is damped there. Such fluid guiding elements are neither temperature resistant, not wear resistant because of the unprotected foam body, and for this mason are only conditionally suitable for sound blocking and damping. For blocking and damping of sound emissions of higher intensity in hot gasses from gas turbines or in hot, aggressive acids or alkalis, such fluid guiding elements can not be considered as suitable.

In a further fluid guiding element for gas disclosed in the German patent document DE 38 30 346 C2 the inner hose jacket is composed of a flexible, wavy and perforated base element, an open-pore foam of a polymer material arranged on its outer side as a sound absorbing material and a compact skin surrounding the outer peripheral surface of the foam as an outer hose jacket. This guiding element is used for guidance of hot gasses and vapors which occur in gas turbines, and also for sound blocking and damping of the sound intensity of pumps for hot acids and alkalis, to provide an absolute value reduction of the sound pressure level by 3dB (A), which means a reduction of the sound intensity by ½.

Furthermore, the patent documents DE 32 20 023 C3 and EP 0 095 582 disclose a fluid guiding element for gasses, whose outer layer is composed of a mainly closed-cell, elastic, thermoplastic foam, while to the contrary its lower layer which performs mainly the function of sound absorption is composed of an open-cell soft foam, for example a polyurethane soft foam. The both layers are connected either by a flame lamination or by a bonding agent. A material insert is also arranged between the layers in form of a reinforcing layer composed for example of a layer, fabric or knit of textile and/or glass fibers. This fluid guiding element can not be also considered to be used for hot gasses or for hot, aggressive fluids because of its material composition.

Finally, U.S. Pat. No. 3,374,856 discloses a fluid guiding element for gas, which has a wavy outer hose jacket of rubber or synthetic plastic impregnated fabric, while the inner hose jacket is composed of a synthetic plastic, for example urethane rubber. A material insert as an intermediate hose is not provided here. FIG. 2 of this patent shows a bending of the fluid guiding element by 180° to maintain its flexibility. A mounting position in this bent form is not expected to be of importance in this document. Also, this fluid guiding element, because of its non temperature resistant materials is not suitable for sound blocking or damping of sound intensity in hot gasses of gas turbines or in aggressive fluids of pumps in the chemical industry.

In addition to these fluid guiding elements for gasses with sound-soft walls, many sound dampers with sound-hard walls are known, such as for example the devices which are disclosed in U.S. Pat. No. 2,886 121, 3,187,835, 3,415,337, 3,227,240, in the European patent documents EP 0 346 551 B1 and EP 0 493 161 A1 and in the German patent document DE OS 2 264 354, which however do not deal with the subject matter of the present invention.

SUMMARY OF THE INVENTION

Accordingly, it is an object of the present invention to provide a fluid guiding element with sound-soft walls of the above mentioned type, which is characterized by a cost-favorable manufacture and easy handling, and at the same time is formed so that it has a sound intensity reduction exceeding the reduction achieved by the known fluid guiding elements and can be utilized in flow passages for hot and chemically aggressive gasses as well as for hot and aggressive acids and alkalis.

In keeping with these objects and with others which will become apparent hereinafter, one feature of the present invention resides in a fluid guiding element having an inner space provided with a first main passage with at least one auxiliary passage distributed over its cross-section with sound-soft walls, which has an inner hose jacket provided with mass-enhancing elements, an outer hose jacket, and a soft material insert arranged between the hose jackets, with at least one turn of 360° extending along the main passage or radially to the longitudinal axis in the main passage.

The term "auxiliary passage distributed over its cross-section" means that the auxiliary passage extends so that it is distributed both in the longitudinal direction of the main passage over its inner cross-section and also can be formed so that only a single auxiliary passage can be wound as a cylindrical helical spring with filling of the inner cross-section of the main passage many times, it contacts with its inner outer peripheral surface the inner hose jacket of the main passage and therefore is arranged with it in a sealing manner. In this case the fluid can flow only through the inner cross-section of the auxiliary passage. It is however also possible that the auxiliary passage does not completely fill the cross-section, but instead "floats" in the cross-section of the main passage, so that the fluid can flow both through the auxiliary passage and also between the outer hose jacket of the auxiliary passage and the inner hose jacket of the main passage, while the auxiliary passage which follows the course of the main passage has at least the same turn as the main passage.

With this construction the sound intensities of a through-flow of the main and auxiliary passages by hot gas and by hot, aggressive fluids are substantially reduced, and the material composition of the inner hose jacket, the outer hose jacket and the material insert between these jackets can be provided, depending on mechanical, chemical and caloric loading, from the above described materials without difficulties. The term "turn" does not mean only a "circular" turn. A turn on the one hand can be formed by a circular, Archimedean, hyperbolic or a logarithmic spiral, or on the other hand can have an elliptic or oval loop up to a knot turn, and finally can have the shape of a serpentine line, in particular the shape of a sine serpentine line. In general, the term "turn" in the sense of the present invention is such a turn which extends from a geometrical central point to an intersecting region of its ends through all four quadrants of an imaginary kartesian coordinate system. One exception is, however, a serpentine line which extends only through two quadrants.

First tests with a fluid guiding element formed in this way showed that for hot combustion gasses of a gas turbine with a sound intensity at the gas outlet of 155dB (A) with only three spiral turns of both the main passage and the auxiliary passage, a sound intensity at the fluid outlet of the main passage reached 92dB (A).

For connecting such a fluid guiding element for blocking or damping of noises propagating in main passages, often it must be connected to a sound source through an adapter as well as a connecting passage, since it forms an obstacle in an immediate vicinity of, example, for a gas turbine.

In accordance with an especially advantageous embodiment of the invention, this connecting passage is formed similarly as a fluid guiding element for blocking and damping. This is achieved in that, a connecting passage between the inlet of the first main passage and the outlet of a sound source is arranged as a second main passage with at least one auxiliary passage distributed over its cross-section and having sound-soft walls. Such a fluid guiding element with two main passages arranged one behind the other and provided with corresponding auxiliary passages, provides for a sound intensity reduction for hot combustion gasses of a gas turbine from 155dB (A) to 78dB (A). As a result, by the correspondingly formed second main passage with its auxiliary passages, a sound damping from 92dB (A) to 78db (A) can be obtained, which means a further sound intensity reduction by almost five times.

Advantageously, both the inner hose jacket of the main passage and the inner hose jacket of the auxiliary passage, depending on mechanical, chemical or calloric loading by the liquid to be guided, are composed of a textile, metal wire-, glass fiber-, synthetic-, natural-, ceramic fabric, non-woven material, metal film such as nickel or high grade steel film, or a soft, thin foil of polyurethane, polysulfone, polyimide, polyamide, polyester, polypropylene or polytetrafulorethylene or tetrafulorethylene derivate (PFA and FEP) or a combination of these materials. The materials from textile to nonwoven materials can be uncoated. Alternatively, for desired gas and fluid tightness, they can be coated with an entropieelastic material, such as natural rubber, rubber or a plastic, or provided with an aluminum coating or vapor deposition of for example 4μ–50μ, or provided with a metal coating applied by a cathode atomization (sputtering).

The material insert between the inner and outer hose jackets of the main and auxiliary passages can be composed of a heap of mineral fibers and/or metal fibers and/or shavings and/or chips of entropieelastic materials or of a foamed, heat-resistant, entropieelastic material.

The outer hose jacket of the main passage and the auxiliary passage in accordance with a further embodiment of the invention is composed of a gas-and liquid-tight plastic, such as polytetrafluorethylene (PTFE), polyamide (PA), polysulfone, polyimide, polyester (PETP), polypropylene (PP), or a textile composed of wire-or glass fibers, synthetic- natural-or ceramic fabric, of non-woven material or a material combination of these materials, which is coated with the abovementioned synthetic plastics at one side or at both sides, or which is uncoated. The selection of these materials depends exclusively on the fluid which acts on the outer hose jacket. The outer hose jacket of the main passage must be loaded in all situations with air. The outer hose jacket of the auxiliary passage, to the contrary, is subjected to hot gasses and aggressive and hot liquids. Correspondingly, a respective resistant material must be selected for the outer hose jacket of the auxiliary passage.

In accordance with an especially advantageous embodiment of the invention, each turn of the fluid guiding element, both of the main passage and the auxiliary passage, is provided with a maximum narrow turn radius. For achieving this objective, it is especially advantageous when the outer hose jacket of the auxiliary passage and/or the main passage, especially when the main passage is a connecting passage, is composed of spirally wound layers which overlap at opposite sides and always cover the mass-enhancing elements so as to be wound from the outer wall of the inner hose jacket in a ring-shaped or spiral-shaped manner. These layers can be composed of felt, nonwoven material, mineral wool or textured fabric of steel fibers, which in connection with air and/or a heat-resistant, foamed, entrophieelastic material between the layers form the material insert. The thusly formed hose jackets are recommended in particular for building-in and their use as auxiliary passages, since due to the overlapping material layers they guarantee a narrow turn radius with high bending flexibility.

For forming the mass-enhancing elements for receiving/withdrawing of the vibration energy, several embodiments are possible. In accordance with a first embodiment, the mass-enhancing elements are composed of metallic or ceramic individual rings which surround the inner hose jacket of the main and the auxiliary passages or hold together the inner hose jacket composed of hose portions.

In accordance with a second embodiment, the mass-enhancing elements both of the main passage and the auxiliary passage are formed by a metal or ceramic spiral which holds together the inner hose jacket composed of spiral-shaped material webs at their overlapping side ends. In this embodiment the hose jackets are composed in a known manner of spiral-shaped material webs with their overlapping side ends surrounding a supporting body of metal or ceramic and together with it are surrounded by a clamping body of metal or ceramic with a C-shaped cross-section. The clamping body at the leg strips which are opposite to its open side, clamp the material webs and their overlapping side ends at this location. A hose jacket of this type is described in detail and in several variants in the German document DE 37 20 231 A1. By the insertion of a metallic or ceramic supporting body in a metallic or ceramic clamping body with a C-shaped cross-section, not only a permanently holdable connection between the sound-soft walls and the metal elements is provided, but also the latter obtain a substantial mass which is required for the sound damping. Ceramic clamping bodies are better recommended for high temperature loads than metallic, which for example with hot gasses above approximately 500° C. have a tendency to softening.

In accordance with a third embodiment, the mass enhancing elements are formed as a metal/or ceramic pieces which are uniformly mounted on the outer side of the inner hose jacket of the main passage and the auxiliary passage.

In accordance with a fourth embodiment, the mass-enhancing elements both of the main passage and the auxiliary passage are composed of a metal or ceramic spiral which surrounds the inner hose jacket, and of a tubular, hose-shaped or similar container of metal or ceramic which has the same turn shape and surrounds the spiracle. It is connected with the corresponding metal or ceramic spiral by clamps or clipped bands. The intermediate space between the inner wall of the tube or the hose and the outer wall of the inner hose jacket is filled with water, high temperature oil, or melting metal alloy.

For promoting the sound intensity reduction by sound absorption, sound reflection or interference phenomena, various arrangement alternatives of the auxiliary passage inside the main passage are possible.

In accordance with a first embodiment, the auxiliary passages are twisted in a string-shaped manner in a first and/or each further main passage around the central longitudinal axis of the main passage. By twisting with a maximum narrow turn radius, in particular with high level of hot gasses, a sound reduction by 20–30 times is provided.

The same is true for a second embodiment of the invention, when the auxiliary passages both in the first and in the second main passage extend in direction of the longitudinal axis of the main passage and are provided with uniform or non-uniform interruptions. In this manner, mode disruption with differently long interruption of the auxiliary passage are provided. With the twisting around the longitudinal axis the modes are compressed and by the swinging out of the mass-enhancing element into the material inserts located between the inner and outer hose jackets are transferred to a different energy type and substantially annihilated.

A further mode reduction as well as a pressure equalization between the auxiliary channels can be obtained in a third embodiment, in that the auxiliary channels are provided in their walls with any, in particular sieve-like throughgoing openings to neighboring auxiliary passages. Before forming and arranging of the auxiliary passages inside the main passages, several embodiments are possible. For example the cross-sectional shape of the main and the auxiliary passages in the first and/or second main passage can be either circular, elliptic or partially elliptic. In a first embodiment in the main passage only one auxiliary passage formed as a cylindrical helical spring with a maximum narrow turn radius can be arranged, so that its outer peripheral line contacts the inner hose jacket of the main passage and the fluid is prevented from a throughflow. In this case the main passage forms only a container for receiving the spiral-shaped wound auxiliary passage. The fluid flows in each case only through the inner cross-section of the auxiliary passage.

In accordance with a further embodiment, at least two auxiliary passages with equal throughflow cross-section are arranged in a circular cross-section of the main passage. They contact at their outer surfaces and at the inner wall of the main passage one above the other and extend longitudinally in each main passage. The shape of the three auxiliary passages in their cross-section can be very different, for example elliptic, oval-shaped, partially elliptic or circular.

When in a circular cross-section of a main passage three auxiliary passages with a round cross-section are arranged so that they are offset relative to one another by 120° and contact each other as well as the inner wall of the inner hose jacket of the main passage, then in the longitudinal direction of the main passage on the one hand throughflow passages are formed with the circular cross-section of the auxiliary passages and on the other hand deviating throughflow passages are formed from circular portions of the outer hose jackets of the auxiliary passages and the inner hose jacket of the corresponding main passage. Since each fluid finds the way of the smallest flow resistance, the mass of the fluid flows through the greater cross-section of the auxiliary passage and only to a smaller extent through the deviating cross-sectional forms between the outer hose jacket of the auxiliary passage and the inner hose jacket of the main passage. Since due to the turns with a narrow turning radius the damping effect on the modes both in the main passages and in the auxiliary passages is very high, the deviation of the pressure losses of the fluid, with reference to the sound damping, does not play any relevant role. A pressure equalization can be performed by the above described throughgoing openings from one auxiliary passage to the other.

In accordance with a further advantageous embodiment, seven auxiliary passages with identical circular cross-section are uniformly distributed in the first and/or in the second main passage with a circular cross-section. One of the auxiliary passages is concentric to the longitudinal axis of the main passage while the other six passages are arranged around the first auxiliary passage and spaced from one another by 60° so as to contact one another. Also, the six outwardly located auxiliary passages contact the inner wall of the inner hose jacket of the main passage. In this embodiment also on the one hand the auxiliary passages can be wound in the form of a cylindrical helical spring and twisted as strings about the longitudinal axis of the main passage. Both these completely different types of the winding provide in a surprising manner the excellent sound intensity reduction of the above mentioned type. An especially advantageous noise damping is produced with three turns of the main passage and the auxiliary passages.

The tests conducted meantime showed that the modes and corresponding sound field structures are provided not only with the throughflow of the main passages and auxiliary passages by hot gases as fluids, but also its advantageous action is exhibited with the passage of another fluid, for example an extremely hot as well as aggressive acid or alkali.

A mixture of a combustion gas and for example water can be also employed. A further damping can be thereby obtained when a spraying device for spraying water into the main and/or auxiliary passage is provided. For damping noises in gas discharge passages of ships and sports boats, a spraying of water into the main and/or auxiliary passages is not required, since in this gas discharge passages water of different origin is used and this mixture flows to the gas outlet. From this reasons, the term "fluid" is used in this application to define a gaseous medium, a liquid medium, a mixture of a liquid medium and a gaseous medium, and also a mixture of a gas such as air and a solid transported by it.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
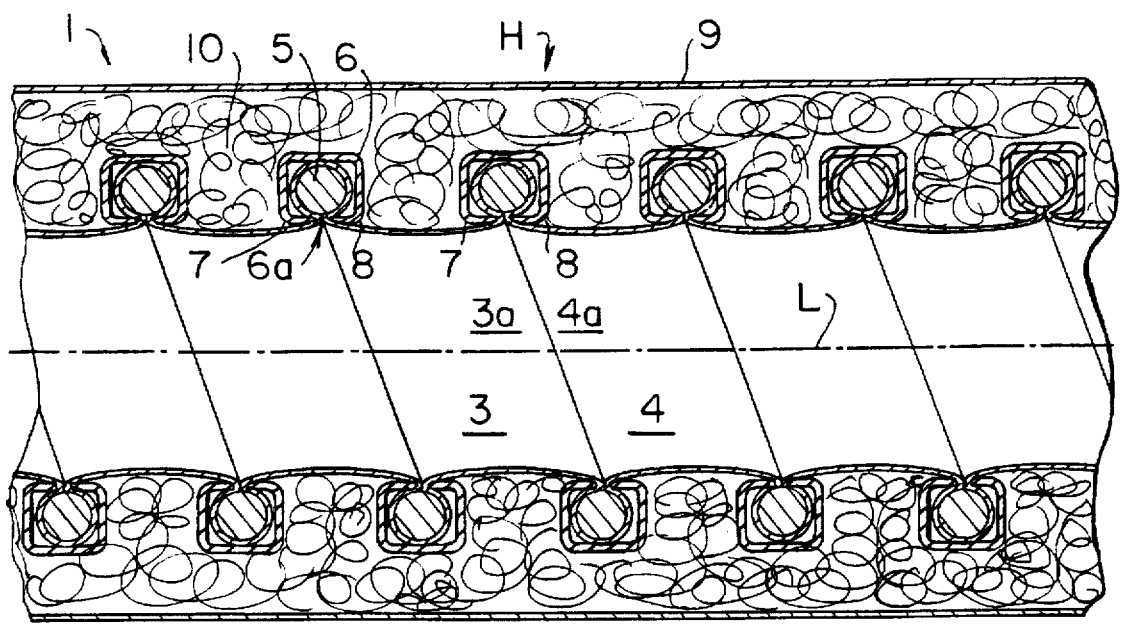
FIG. 1 is a view showing a partial longitudinal section through a fluid guiding element with a smooth outer hose jacket, a material insert and an inner hose jacket composed of two spiral-shaped material webs assembled of a spiral-shaped clamping body of metal or ceramic with a C-shaped cross-section and a metallic support body of metal or ceramic.

A fluid guiding element shown in FIG. 1 in accordance with the first embodiment is identified as a whole with reference numeral 1. It has an inner hose jacket 2 which, depending on the temperature and the type of the fluid to be guided (gas, liquid, gas-liquid mixture) can be composed of a textile, a metal wire fabric, a glass fiber fabric, a synthetic fabric, a natural fabric, a ceramic fabric, a nonwoven material or a soft, thin foil of polyurethane, polysulfone, polyimide, polyamide, polyester, polypropylene, polytetrafluorethylene or a combination of these materials. Depending on a desired gas and liquid tightness, these basic materials can be coated with an entropieelastic material, such as natural rubber, rubber or a synthetic plastic material, or provided with a thin aluminum coating of for example 25–50 μ. Furthermore, the inner hose jacket 2 is composed of two spiral-shaped material webs 3, 4 of the equal width of the above mentioned materials, with overlapping side ends 3a, 4a which surround a supporting body 5 of metal or ceramic and together with the supporting body 5 are surrounded by a clamping body 6 with a C-shaped cross-section so as to be assembled together. Their opposite leg strips 7, 8 at an opening side 6a clamp the material webs 3, 4 and its overlapping side ends 3a, 4a at this location. The outer hose jacket 9 is composed, depending on loading and use of the guiding element 1 as a main passage and/or an auxiliary passage, either of the same materials as the inner hose jacket 2 or of a gas or liquid-tight synthetic plastic, such as polytetrafluorethylene (PTFE), polyamide (PA), polysulfone, polyimide, polyester (PETP), polypropylene (PP), or a textile which is coated with this materials at one side or at both sides or which is uncoated, and which is composed of wire fibers or glass fibers, synthetic fabric, natural fabric or ceramic fabric, of nonwoven material or a combination of these materials.

The material insert 10 between the inner hose jacket 2 and the outer hose jacket 9 is formed from a heap of mineral fibers and/or metal fibers and/or shavings and/or chips of heat-resistant, and entrophie-elastic materials or a foamed, entrophie-elastic materials with corresponding temperature resistance.

Figure 2:
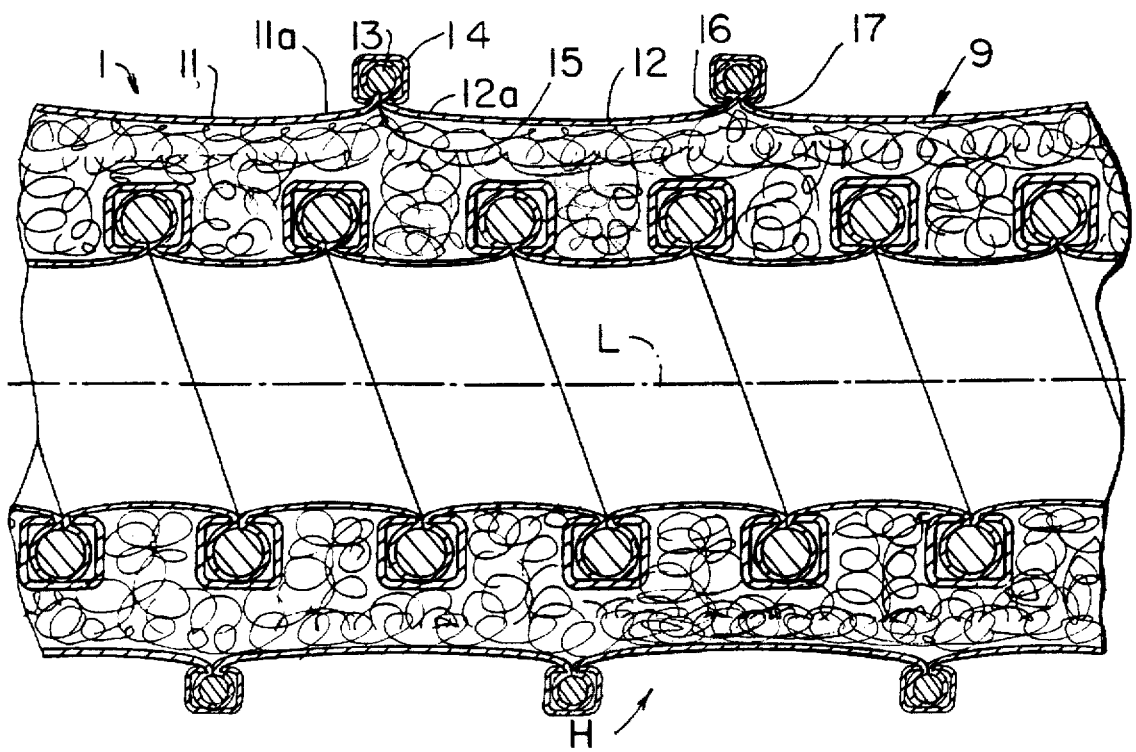
FIG. 2 is a view showing a partial longitudinal section through a second embodiment of a fluid guiding element, with the outer hose jacket composed of two spiral-shaped material webs assembled of a spiral-shaped clamping body with a C-shaped cross-section and a supporting body.

The embodiment of FIG. 2 differs from the embodiment in FIG. 1 in that the outer hose jacket 9 is assembled in a known manner from spiral-shaped material webs 11 and 12 whose overlapping side ends 11a, 12a surround a supporting body of metal or ceramic and together with the supporting body 13 are surrounded by a clamping body 14 with a C-shaped cross-section of metal or ceramic so as to assembled. Its opposite leg strips 16, 17 at an outer side 15 clamp the overlapping side ends 11a, 12a of the material webs 11, 12 at this location.

Figure 3:
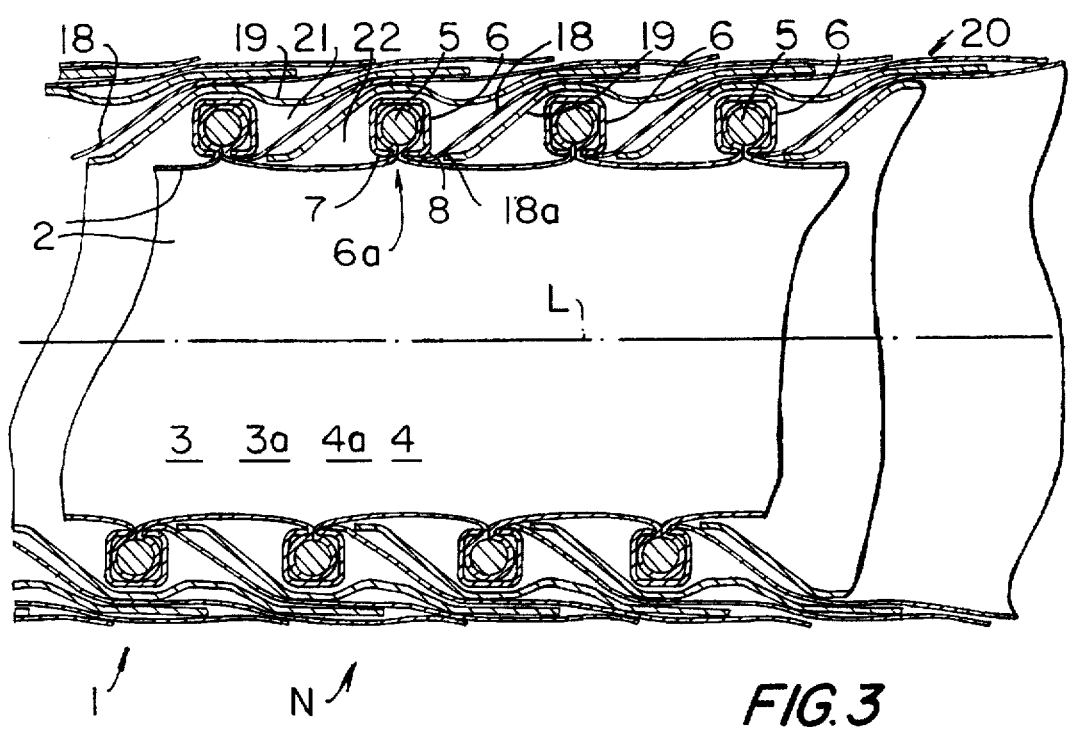
FIG. 3 is a view showing a partial longitudinal section through a third embodiment of a fluid guiding element, with the inner hose jacket composed of two spiral-shaped material webs assembled of a spiral-shaped clamping body with a C-shaped cross-section and a metallic supporting body, in which a further partially clamped and partially not clamped material web overlappingly covers the subsequent clamping body with a C-shaped cross-section.

The embodiments of the fluid guiding element 1 in accordance with FIGS. 1 and 2 is suitable, especially but not exclusively, for the utilization as a main passage H. In contrast, the embodiment shown in FIG. 3 is suitable especially, but also not exclusively for the use as an auxiliary passage N and a connecting passage, since it is characterized by a special flexibility and bendability of its scaled outer hose jacket 9. The fluid guiding element 1 of the embodiment of FIG. 3 has an inner hose jacket 2 which is formed as the inner hose jacket of the embodiment of FIGS. 1 and 2. For this reason the same parts are identified with the same reference numerals. The substantial difference between the embodiment of FIG. 3 and the embodiments FIGS. 1 and 2 is that, in addition to both material webs 3, 4, a further material web 18 is clamped with the C-shaped clamping body 6 with its end 18a and covers with its other end two subsequent turns of the clamping body 6. A further material web 19 is inserted between this overlapping material web 18 and the subsequent turns of the clamping body 6. Thereby a spiral shaped outer hose jacket 20 with scale-shaped nature is formed, whose scales are produced by individual material webs 18, 19 and which guarantees a high flexibility of this fluid guiding element 1. The intermediate spaces 21, 22 between the material webs 18, 19 on the one hand and the outer wall of the inner hose jacket 2 and the material web 19 on the other hand are filled either with air or with a soft, entrophie-elastic, heat resistant material which can be also foamed and simultaneously forms a material insert.

Figure 4:
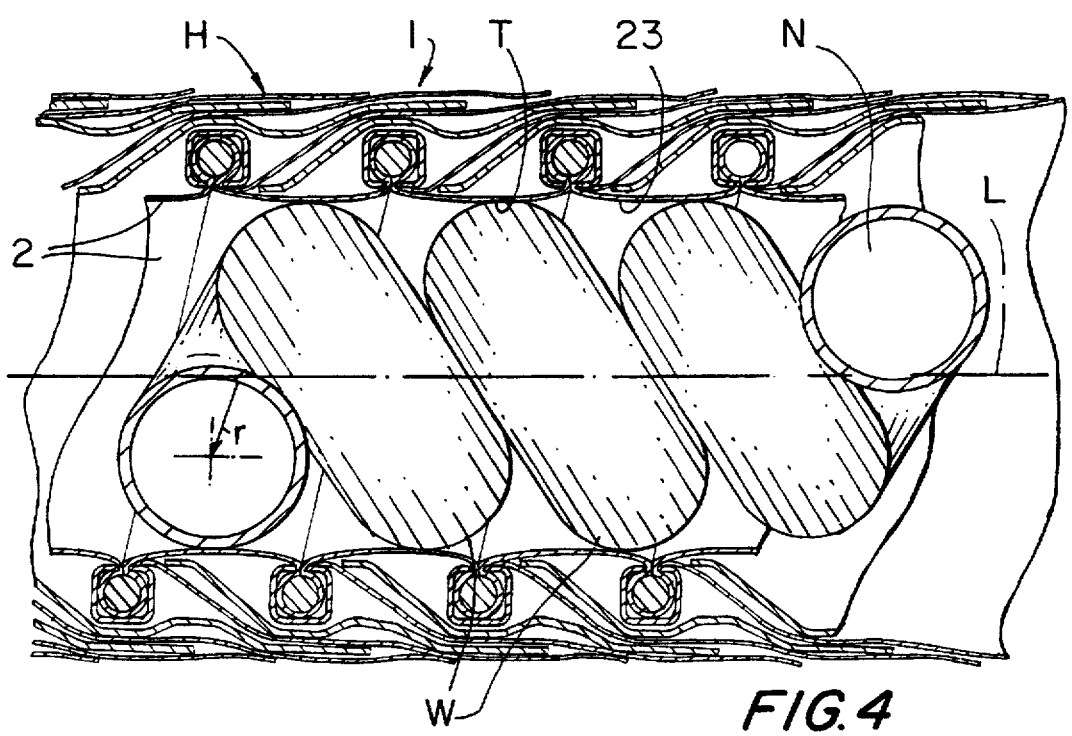
FIG. 4 is a view showing a partial longitudinal section in accordance with FIG. 3, but for another type of an auxiliary passage which is wound as a cylindrical helical spring with a narrow winding radius.

In the embodiment of FIG. 4 the fluid guiding element 1 of FIG. 3 is utilized as a main passage H, in which an auxiliary passage 9 is arranged in form of a cylindrical spiral with very narrow winding radius r and with four turns W. The auxiliary passage N is arranged so that it contacts with an outer peripheral line T the inner wall 23 of the inner hose jacket 2. Thereby a fluid throughflow between the outer periphery of the auxiliary passage N and the inner wall 23 of the inner hose jacket 2 is suppressed. In this case the fluid flows only through the inner space of the auxiliary passage N, while the main passage H serves as a receiving container with additional damping effect for the auxiliary passage N.

Figure 5:
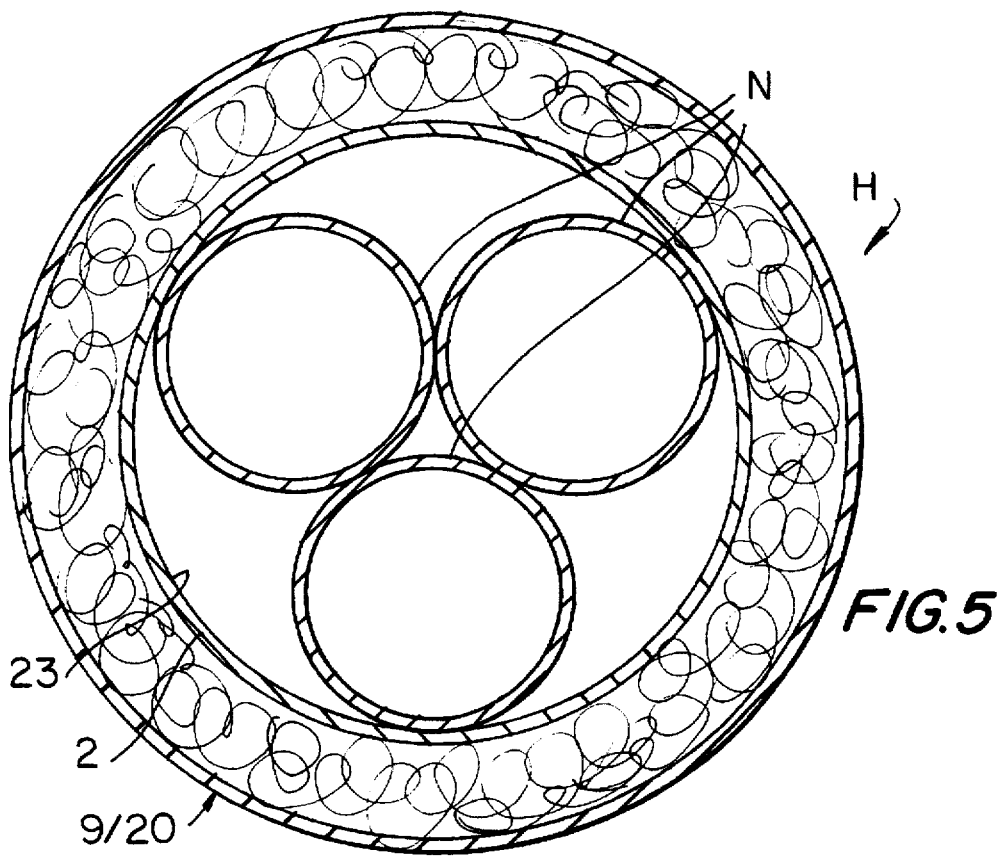
FIG. 5 is a view showing a cross-section through a main passage, in which three auxiliary passages with an identical circular cross-section are arranged so that they are offset relative to one another by 120°.

In the embodiment of FIG. 5, three auxiliary passages N with a circular cross-section are arranged in a main passage H with a circular cross-section so that they are spaced from one another by 120°. They also contact one another and the inner wall 23 of the inner hose jacket 2 of the main passage H.

Figure 6:
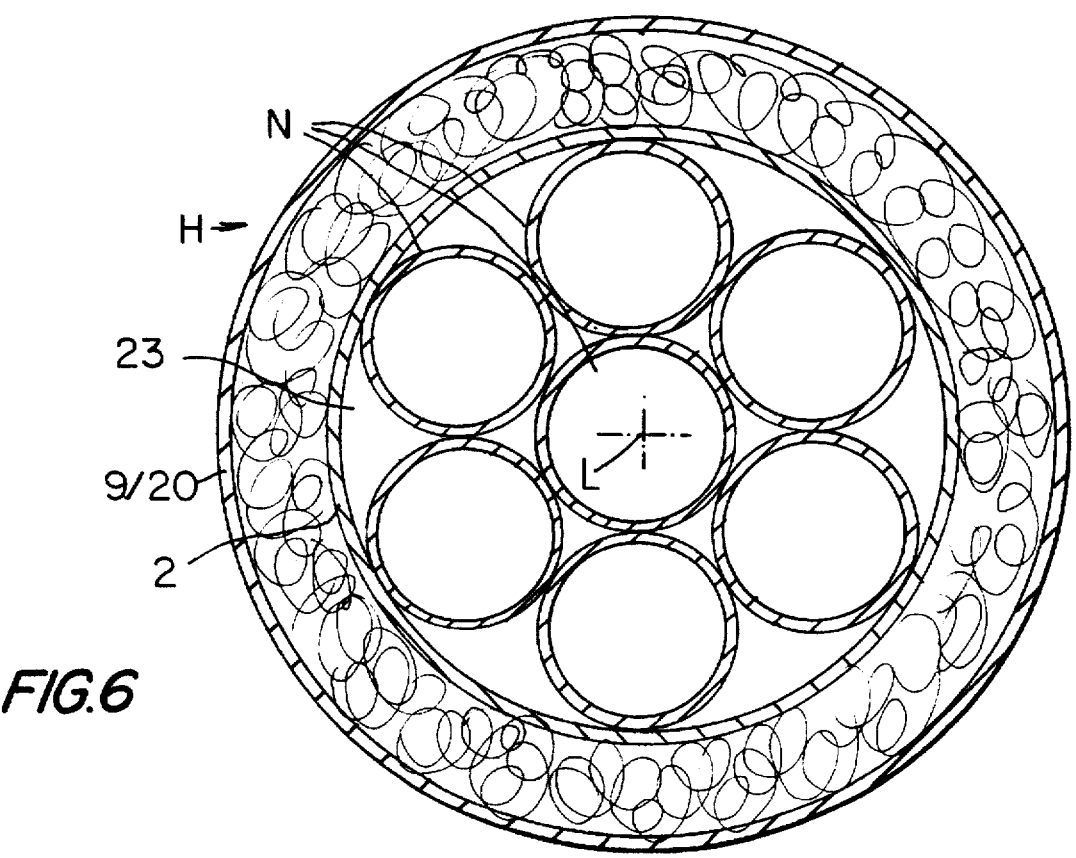
FIG. 6 is a view showing a cross-section through a main passage, in which seven auxiliary passages with an identical through flow cross-section are arranged, with one passage arranged concentrically and the other passages offset relative to one another by 60°.

A similar construction is shown in FIG. 6. Here seven auxiliary passages N with an identical, circular cross-section are uniformly arranged in a main passage H with a circular cross-section. One of the auxiliary passages N is concentric to the longitudinal axis L of the main passage 8, while the other six auxiliary passages are arranged around the first auxiliary passage so as to be spaced from one another by 60°. They contact one another and the six outer auxiliary passages N also contact the inner wall 23 of the inner hose jacket 2 of the main passage H.

Figure 7:
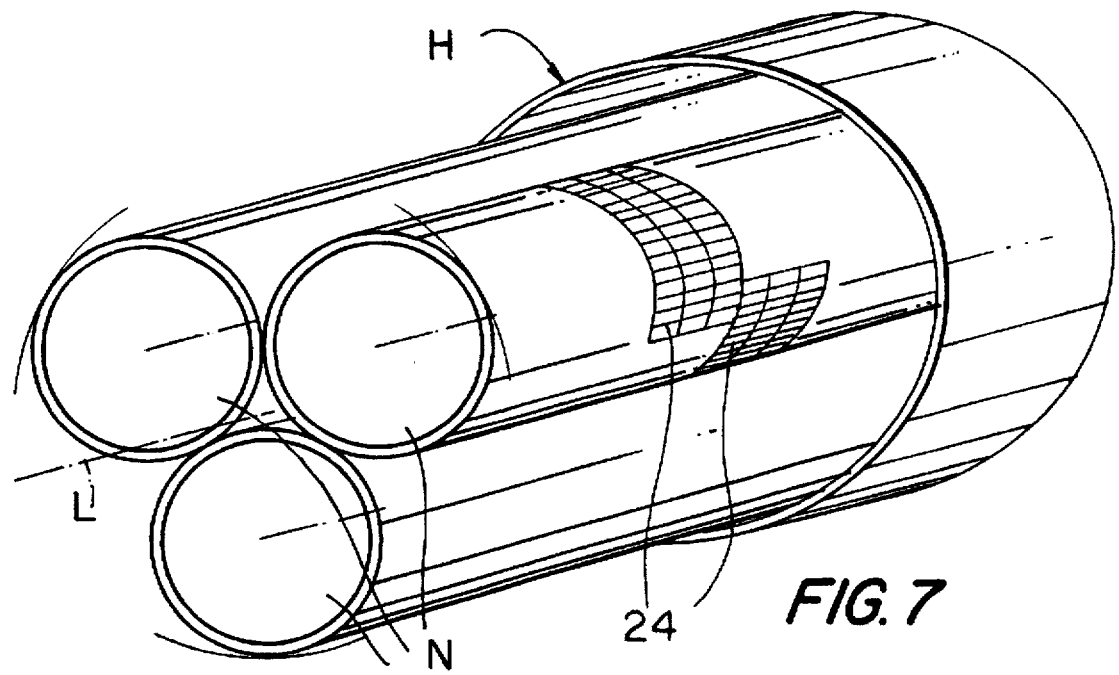
FIG. 7 is a perspective partial view corresponding to FIG. 5 and showing three auxiliary passages arranged in a main passage, wherein one auxiliary passage is provided with a sieve-shaped wall perforations.

In the fluid guiding element shown in FIG. 7, whose cross-section substantially corresponds to the cross-section of FIG. 5, three or more auxiliary passages N, similarly to the cross-sectional view of FIG. 5, are arranged in one main passage H. In these auxiliary passages N, one auxiliary passage has grate-shaped throughgoing openings 24 which extend both through the inner hose jacket 2 as well as the material insert 10 and the outer hose jacket 9.

Figure 8:
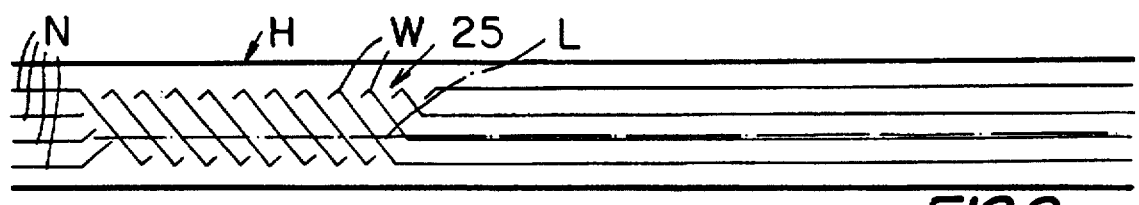
FIG. 8 is a schematic partial view through a main passage with four auxiliary passages arranged in it and formed as a string twisted along the longitudinal axis of the main passage.

In the embodiment of FIG. 8 four auxiliary passages N are arranged uniformly in a main passage H. In a region 25 they are twisted with one another in a string-like manner, and each auxiliary passage N has substantially nine turns W.

Figure 9:
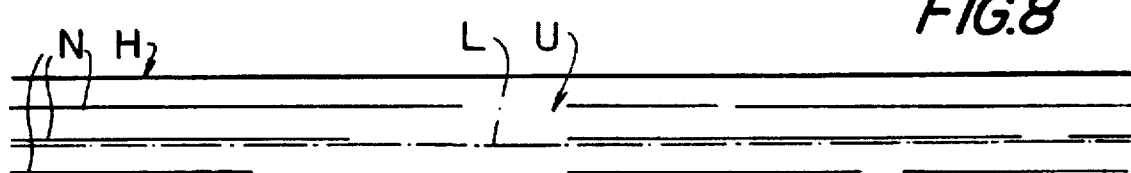
FIG. 9 shows an embodiment corresponding to the embodiment of FIGS. 5 and 7, however with a differently long main passage and with auxiliary passages provided with differently long interruptions.

In the embodiment of FIG. 9 three auxiliary passages N extend substantially in the direction of the longitudinal axis L in a main passage H and provided with uniform interruptions U. The modes as well as other sound field structures, such as for example longitudinal waves are interrupted, and a corresponding reduction of the sound intensity is obtained by additional absorption, reflexion and interference phenomena.

Figure 10:
FIG. 10 is a view showing an embodiment corresponding to the embodiment of FIGS. 5 and 7 with three auxiliary passages, which after a first equally long interruption merge into only two auxiliary passages and after a further identically long interruption are replaced by seven smaller auxiliary passages.

An advantageous effect is also provided when as shown in FIG. 10, auxiliary passages N, $N_1$, $N_2$ with different diameters as well as with the uniform interruption $U_1$ are arranged in a main passage H. Thereby the corresponding flow fluid with a sound level is transferred in a diffusor-like manner from three auxiliary passages N into expanded auxiliary passages $N_1$, and then again into seven auxiliary passages $N_2$ with a corresponding reduced throughflow cross-section to be compressed.

Figure 11:
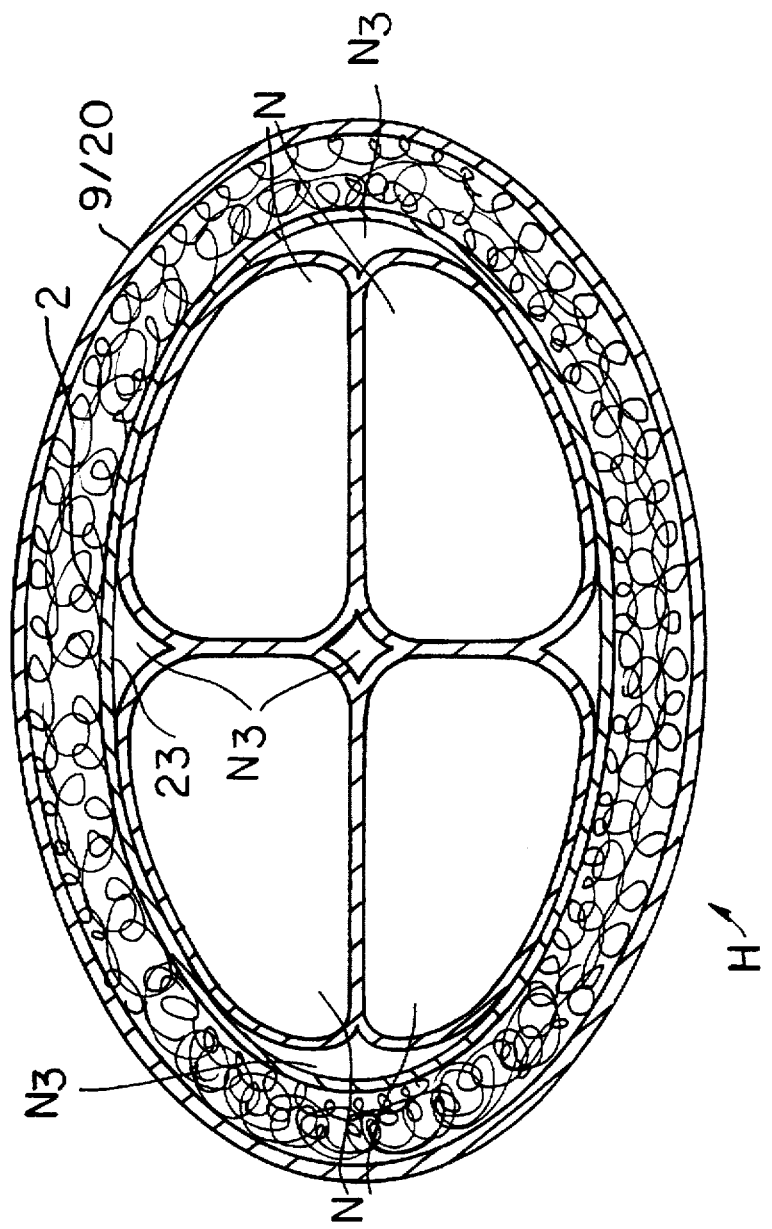
FIG. 11 is a view showing a cross-section through a main passage with an elliptic cross-section and four auxiliary passages arranged in it and having a partially-elliptic cross-section.
Figure 12:
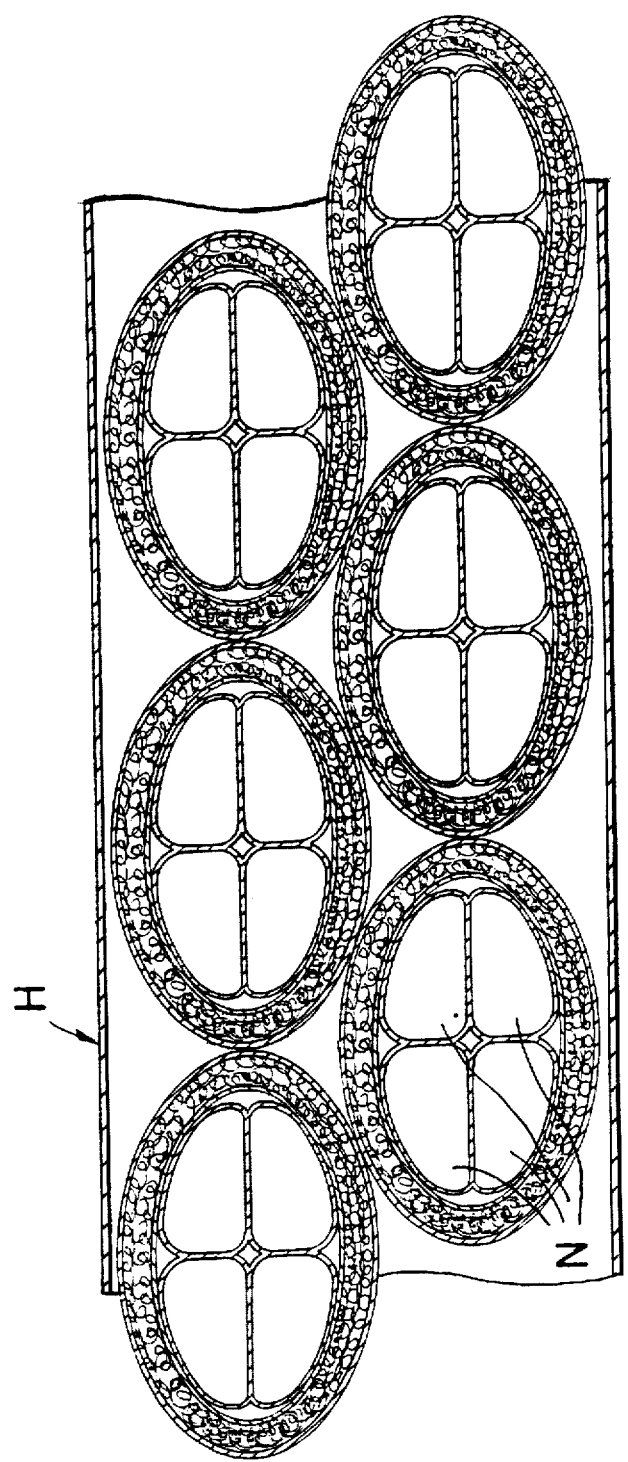
FIG. 12 is a view showing a partial longitudinal cross-section through a main passage with an auxiliary passage which is wound in the form of a cylindrical helical spring of FIG. 4 sectioned in a longitudinal direction, and which is further subdivided into four partially elliptical auxiliary passages of FIG. 11.

In the embodiment of FIG. 11, four partially elliptic auxiliary passages N are arranged in a main passage H with an elliptic cross-section. The three auxiliary passages $N_3$ having different throughflow cross-sections are also provided. In this fluid guiding element the decisive blocking and dampening of the sound intensity by the auxiliary passages N and, to a smaller extent, by the auxiliary passages $N_3$ is provided. When a fluid guiding element 1 of FIG. 11 is wound to form a coil in accordance with the auxiliary passage N in FIG. 3 and arranged in a main passage H in accordance with FIGS. 1-3, a cross-section shown in FIG. 12 is produced. In this case four spiral-shaped wound auxiliary passages with a partially elliptic cross-section extend through the main passage H of FIG. 1. The main passage H can have a circular or also an elliptic cross-section.

In all embodiments of FIGS. 5-12, the corresponding main passage H can be provided with special inserts with the cross-sections shown in FIGS. 1-3. The cross-sectional form of FIG. 3 is especially recommended for auxiliary passages, since it can be wound with relatively low force application and extremely low winding radius R and thereby can produce a surprisingly good damping effect. Basically, both for the main passage H and for the auxiliary passage N, each of the three basic embodiment forms of FIGS. 1–3 can be selectively utilized in accordance with the corresponding applications.

Figure 13:
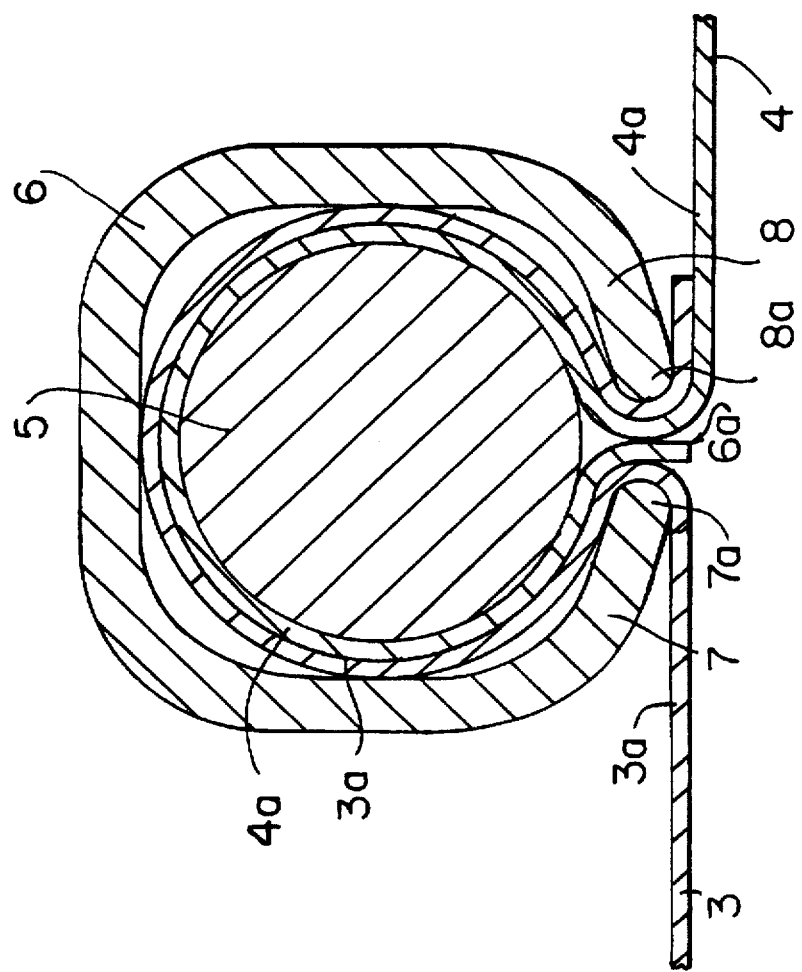
FIG. 13 is a view showing a cross-section of a connection between two spiral-shaped material webs by a supporting body and a spiral with a C-shaped cross-section of metal or ceramic on an enlarged scale.

In FIG. 13 the design of the inner hose jacket 2 is shown on an enlarged scale, with the design of the outer hose jacket 9 corresponding to that of FIG. 2. The both spiralshaped material webs 3, 4 are turned around a spiralshaped supporting body 5 with a substantially circular cross-section of metal or ceramic with their overlapping side ends 3a, 4a, so that they are embraced and held together by the similar spiralshaped clamping body 6 with a C-shaped cross-section. The leg strips 7, 8 of the clamping body 6 are opposite to one another at the opening location 6a, and clamp on this location the overlapping side ends 3a, 4a of the material webs 3, 4. The edges 7a, 8a of the leg strips 7a are rounded, for preventing tearing of the material webs 3, 4 at this location. This basic design of both material webs 3, 4 in connection with the supporting body 5 and the clamping body 6 is described with several variants in all details in the German document DE 37 20 321 A1 and therefore does not constitute the subject matter of the present invention.

In the embodiment of FIG. 3 additionally the material web 18 is clamped between the leg strips 7, 8 of the clamping body 6 with a C-shaped cross-section, as shown in FIG. 3. For high temperatures, it is recommended to form both the supporting body 5 and the clamping body 6 of ceramic instead of metallic materials. During sound damping, the mass of the spiral body 5 and the clamping body 6 among others is a decisive criterium for damping the sound intensity in the main passages H and the auxiliary passages N. From this reason, for certain different application these mass-enhancing metal and ceramic elements 5, 6 can be composed of not shown metal or ceramic pieces which are uniformly distributed on the outer side of the inner hose jacket 2 or the outer hose jacket 9, 20 of the main passage H and the auxiliary passage N.

It will be understood that each of the elements described above, or two or more together, may also find a useful application in other types of constructions differing from the types described above.

While the invention has been illustrated and described as embodied in fluid guiding element for blocking and damping noise expanding in main passages, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fluid guiding element for blocking and damping noises propagating in it, comprising a main passage composed of a flexible inner hose jacket which is resistant to mechanical, chemical or calloric load by a fluid to be guided through the fluid guiding element; an outer hose jacket and a material insert arranged between said hose jackets and composed of a flexible material which is resistant at least to calloric loads, said main passage having a fluid inlet and a fluid outlet and being provided with at least one turn of substantially 360° between said fluid inlet and said fluid outlet; and at least one auxiliary passage arranged in a cross-section of said main passage and having sound-soft walls, said at least one auxiliary passage being composed of an inner hose jacket, an outer hose jacket and a material insert arranged between said inner and outer hose jackets, said auxiliary passage being provided with at least one turn of substantially 360°.

2. A fluid guiding element as defined in claim 1, wherein said main passage is provided on its outer side with mass-enhancing elements, said inner hose jacket of said auxiliary passage being also provided with mass-enhancing elements.

3. A fluid guiding element as defined in claim 1; and further comprising a connecting passage arranged to extend between said inlet of said main passage and an outlet of a sound source and formed as a second main passage with at least one auxiliary passage distributed over its cross-section and provided with sound-soft walls.

4. A fluid guiding element as defined in claim 3, wherein said inner hose jacket of said main passage and said inner hose jacket of said auxiliary jacket is composed of a material which is selected in correspondence with mechanical, chemical, or calloric loading by the fluid to be guided and is selected from the group consisting of a textile, a metal wire fabric, a glass fiber fabric, a synthetic fabric, a natural fabric, a ceramic fabric, a nonwoven material, a metal film, and a soft, thin foil, which is coated with a metal coating selected from the group consisting of a galvanized metal coating, an evaporation deposited metal coating and a sputtered metal coating.

5. A fluid guiding element as defined in claim 4, wherein said metal film is a film selected from the group consisting of a nickel film and a high grade steel film.

6. A fluid guiding element as defined in claim 4, wherein soft, thin foil is composed of a material selected from the group consisting of polyurethane, polysulfone, polyimide, polyamide, polyester, polypropylene, polytetrafluorethylene and a combination of these materials.

7. A fluid guiding element as defined in claim 1, wherein the material insert between said inner hose jacket and said outer hose jacket is composed of a heap of entrophieelastic material selected from the group consisting of mineral fibers, metal fibers, shavings and chips.

8. A fluid guiding element as defined in claim 1, wherein said material insert between said inner hose jacket and said outer hose jacket of said main passage and said auxiliary passage is composed of a foamed, heat-resistant, entrophie-elastic material.

9. A fluid guiding element as defined in claim 1, wherein said outer hose jacket of said main passage and said auxiliary passage is composed of a gas and fluid-tight synthetic plastic material selected from the group consisting of a polytetrafluorethylene or tetrafluorethylene derivate, polyimide, polysulfone, polyamide, polyester, and polypropylene.

10. A fluid guiding element as defined in claim 1, wherein said outer hose jacket of said main passage in said auxiliary passage is composed of a textile which is composed of a material selected from the group consisting of wire fibers, glass fibers, synthetic fabric, natural fabric, ceramic fabric, nonwoven material and their combination.

11. A fluid guiding element as defined in claim 10, wherein said textile is coated at least at one side with a gas and fluid-tight synthetic plastic material selected from the group consisting of polytetrafluorethylene, tetrafluorethylene derivate, polyimide, polysulfone, polyamide, polyester, and polypropylene.

12. A fluid guiding element as defined in claim 1, wherein said outer hose jacket of at least one of said auxiliary passage and said main passage has a plurality of layers which overlap at their both sides and cover mass-enhancing elements of said inner hose jacket so as to start from an outer wall of said inner hose jacket and to be wound, said layers being composed of a material selected from the group consisting of felt, nonwoven material, mineral wool and textured fabric of steel fibers, said layers being arranged so that air is located between them, and said layers together with the air form said material insert.

13. A fluid guiding element as defined in claim 1, wherein said outer hose jacket of at least one of said auxiliary passage and said main passage has a plurality of layers which overlap at their both sides and cover mass-enhancing elements of said inner hose jacket so as to start from an outer wall of said inner hose jacket and to be wound, and a heat resistant, entrophie-elastic material located between said layers and forming together with said layers said material insert.

14. A fluid guiding element as defined in claim 2, wherein said mass-enhancing elements are composed of individual rings of a material selected from the group consisting of a metal material and a ceramic material, said individual rings surrounding said inner hose jacket of said main passage and said auxiliary passage.

15. A fluid guiding element as defined in claim 2, wherein said inner hose jacket of said main passage and said auxiliary passage is composed of a plurality of hose portions, said mass-enhancing elements being composed of individual rings of a material selected from the group consisting a metal material and a ceramic material and holding together said hose portions of said inner hose jacket.

16. A fluid guiding element as defined in claim 2, wherein said mass-enhancing elements of said main passage and said auxiliary passage are composed of a spiral of a material selected from the group consisting of a metal material and a ceramic material, said inner hose jacket being composed of spiral-shaped material webs which have overlapping side ends and are held together by said spiral of said mass-enhancing elements.

17. A fluid guiding element as defined in claim 2, wherein said mass-enhancing elements are formed as pieces composed of a material selected from the group consisting of a metal material and a ceramic material and uniformly distributed over an outer side of said inner hose jacket of said main passage and said auxiliary passage.

18. A fluid guiding element as defined in claim 2, wherein said mass-enhancing elements of said main passage and said auxiliary passage include a spiral surrounding said inner hose jacket and composed of a material selected from the group consisting of metal and ceramic, a container surrounding said spiral and connected with the latter and composed of a material selected from the group consisting of metal and ceramic, and a filler which fills an intermediate space between an inner wall of said container and an outer wall of said inner hose jacket.

19. A fluid guiding element as defined in claim 18, wherein said container is formed as a structure selected from the group consisting of a pipe and a hose.

20. A fluid guiding element as defined in claim 18; and further comprising means for connecting said container with said spiral and including clamps.

21. A fluid guiding element as defined in claim 18; and further comprising means for connecting said container with said spiral and including bands.

22. A fluid guiding element as defined in claim 18, wherein said filler is composed of a material selected from the group consisting of water, high temperature oil and a melting metal alloy.

23. A fluid guiding element as defined in claim 1, wherein said auxiliary passage in said main passage is twisted around a central longitudinal axis of said main passage as a string.

24. A fluid guiding element as defined in claim 3, wherein said auxiliary passage of said second main passage is twisted around a central longitudinal axis of said second main passage as a string.

25. A fluid guiding element as defined in claim 3, wherein said auxiliary passages in said fist main passage and in said second main passage extend in direction of a longitudinal axis of said main passages.

26. A fluid guiding element as defined in claim 25, wherein said auxiliary passages are provided with interruptions selected from the group consisting of uniform interruptions and nonuniform interruptions.

27. A fluid guiding element as defined in claim 24, wherein said auxiliary passages in said first main passage and in said second main passage are provided in portions with different number of said auxiliary passages over a cross-section of said main passage and therefore have different cross-sections.

28. A fluid guiding element as defined in claim 1, wherein there are several said auxiliary passages, at least one of said auxiliary passages having a wall provided with throughgoing openings to another of said auxiliary passages.

29. A fluid guiding element as defined in claim 28, wherein said throughgoing openings are sieve-shaped openings.

30. A fluid guiding element as defined in claim 1, wherein said main passage and said auxiliary passage have a cross-section selected from the group consisting of a circular cross-section, an elliptic cross-section and a partially elliptic cross-section.

31. A fluid guiding element as defined in claim 3, wherein said first main passage, said second main passage and said auxiliary passage have a cross-section selected from the group consisting of a circular cross-section, an elliptic cross-section and a partially elliptic cross-section.

32. A fluid guiding element as defined in claim 1, wherein at least three such auxiliary passages are arranged in a circular cross-section of said main passage and have an identical through flow cross-section so that said auxiliary passages contact one another at their outer surface and also contact with an inner wall of said main passage and extend along said main passage.

33. A fluid guiding element as defined in claim 1, wherein said main passage has a circular cross-section, three said auxiliary passages being arranged in said circular cross-section of said main passage and spaced from one another by 120° so as to contact one another and also to contact an inner wall of said inner hose jacket of said main passage, said auxiliary passages having a circular cross-section.

34. A fluid guiding element as defined in claim 1, wherein said main passage has a circular cross-section, seven said auxiliary passages having identical circular cross-sections are uniformly distributed in said circular cross-section of said main passage and include one auxiliary passage extending concentrically through a longitudinal axis of said main passage and other six auxiliary passages which are spaced from one another by 60° and arranged around said first mentioned auxiliary passage, so that said auxiliary passages contact one another and said six auxiliary passages also contact an inner wall of said inner hose jacket.

* * * * *